Feb. 10, 1948.    J. D. GARCIA    2,435,625
RESILIENT WHEEL FOR VEHICLES
Filed Oct. 31, 1946    3 Sheets-Sheet 1
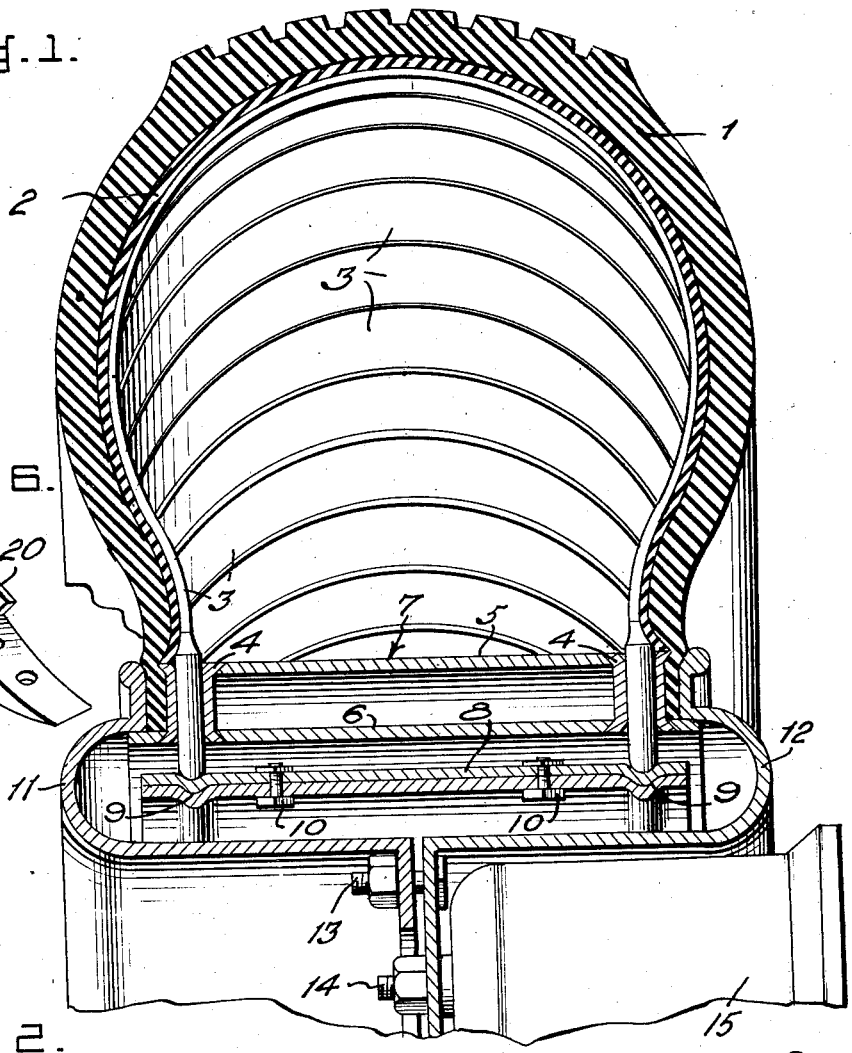
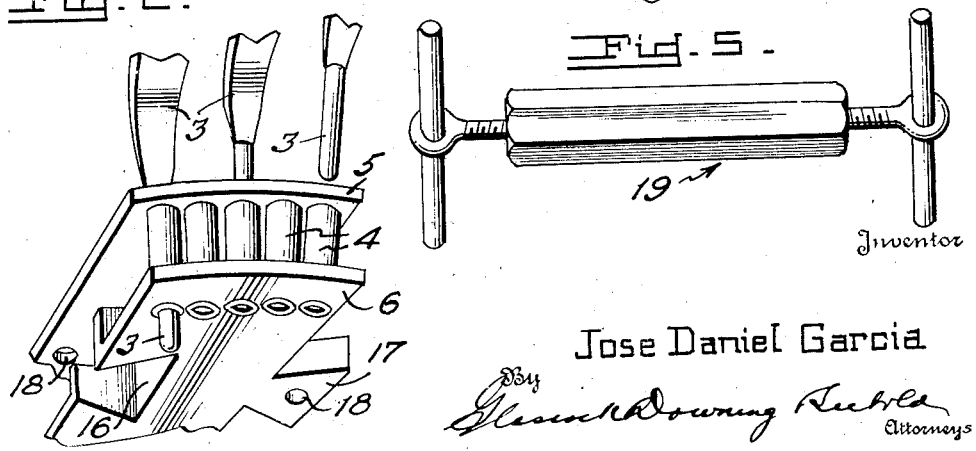
Jose Daniel Garcia

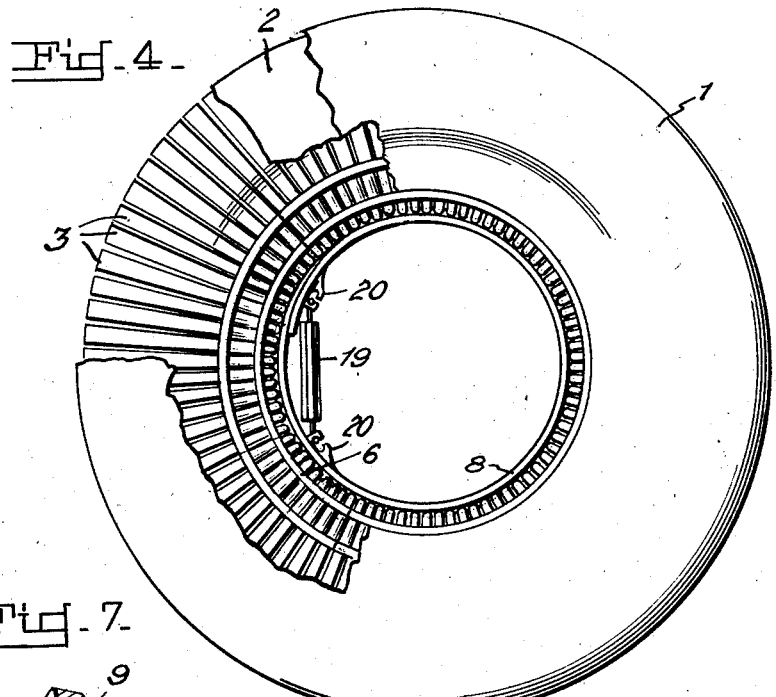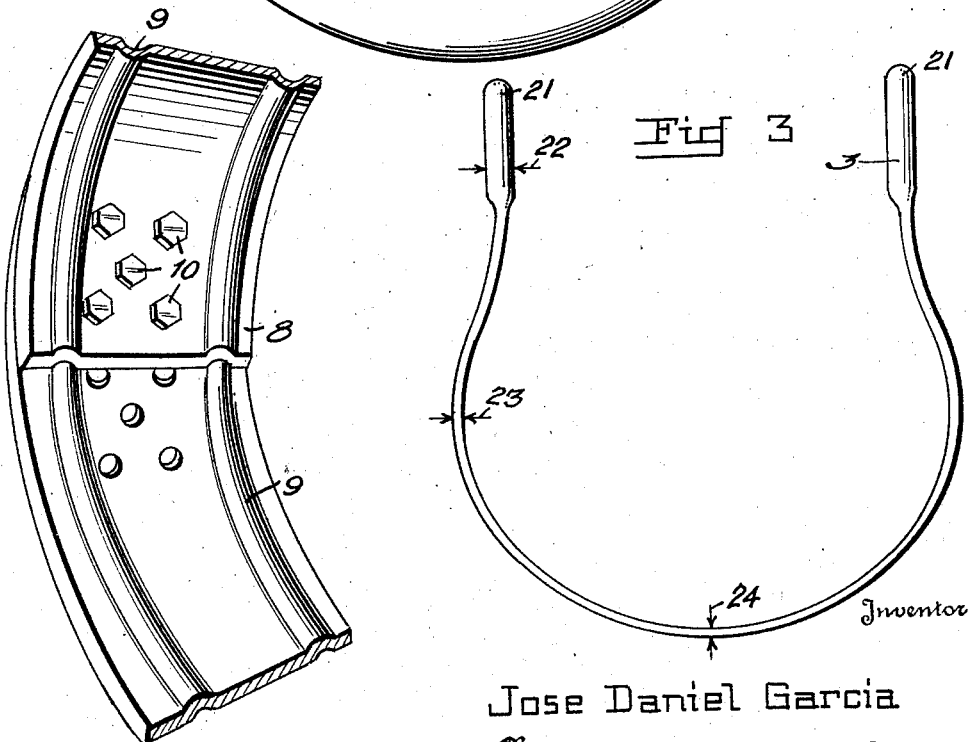

Feb. 10, 1948. J. D. GARCIA 2,435,625
RESILIENT WHEEL FOR VEHICLES
Filed Oct. 31, 1946 3 Sheets-Sheet 3

Inventor

Jose Daniel Garcia

Patented Feb. 10, 1948

2,435,625

UNITED STATES PATENT OFFICE 2,435,625

RESILIENT WHEEL FOR VEHICLES

José Daniel Garcia, Buenos Aires, Argentina

Application October 31, 1946, Serial No. 706,973

6 Claims. (Cl. 152—279)

The present invention has reference generally to resilient wheels and more particularly relates to a cushioned tire.

It is the object of this invention to provide a tire embodying resilient means to eliminate the use of compressed air and thereby avoid punctures and at the same time making riding entirely safe at all speeds and as easy and comfortable as with a pneumatic tire.

Heretofore several attempts have been made for the elimination of compressed air in tires by the insertion of springs therein, but such devices have been operable only in theory and actual practice has shown that spring breakage was considerable due to the fact that the entire load was supported exclusively by exactly the limited number of springs actually in contact with the ground, the balance of the springs remaining idle or inactive, resulting in entirely too much strain being placed on the contacting springs. Furthermore, defective spring design, over-strained by the lack of sufficient material where the most flexing occurs and with their load supporting ends rigidly fixed, without any provision for shock-absorbing, made such springs particularly sensitive to sudden shocks which finally caused their breakage.

The present invention solves these problems in a practical and efficient manner by the employment of novel means that gives each and every spring inside the tire casing a semi-elastic, shock-absorbing support, and which at the same time causes all the springs inside the said casing to work simultaneously, each spring doing its part to proportionately sustain the load even though not in actual contact with the ground through the casing, thus making it possible to distribute the load on all of the springs so that they do not reach their permanent deformation limit even when the greatest sudden overloads occur, thus insuring of the longevity thereof.

It is the further purpose of this invention to provide a novel type of spring which may be made of round or flat material of sufficient thickness to permit its being mathematically tapered to avoid undue weakness or stiffness at the flexing sides while the ends, containing the same quantity of material as the widest part of the spring, are the strongest part thereof and thus precludes the possibility of breakage at this heretofore weakest point.

More particularly, the present invention may be said to consist briefly of a flexible casing having a tread and side walls with a series of U-shaped springs arranged therein having straight attaching portions which are slidably mounted in an annular supporting member in such a manner that the straight portions project radially through supporting member while the inner ends contact a floating, resilient ring which is loosely housed in a two-part channeled mounting rim, which latter also acts to clamp the casing to the supporting member.

Other objects as well as the natural characteristic features and scope of the invention will be more readily apparent from the following description taken in connection with the drawings and pointed out in the claims accompanying this specification.

The invention is clearly illustrated in the accompanying drawings in which,

Figure 1 is a transverse sectional view through the improved tire when applied to a wheel.

Figure 2 is a fragmentary perspective detail of a portion of the annular supporting member.

Figure 3 is a side elevational view, partly broken away, showing improved tire with the inner floating ring being applied.

Figure 4 is an elevational detail of the turnbuckle used for adjusting the split floating ring.

Figure 5 is a perspective detail of one of the brackets carried by the ring for accommodating one end of the turnbuckle.

Figure 6 is an elevational view of one of the improved U-shaped springs.

Figure 7 is a large perspective detail showing one method of connecting the overlapping ends of the floating ring.

Similar characters of reference are employed in all of the above described views to indicate corresponding parts.

Figure 8:
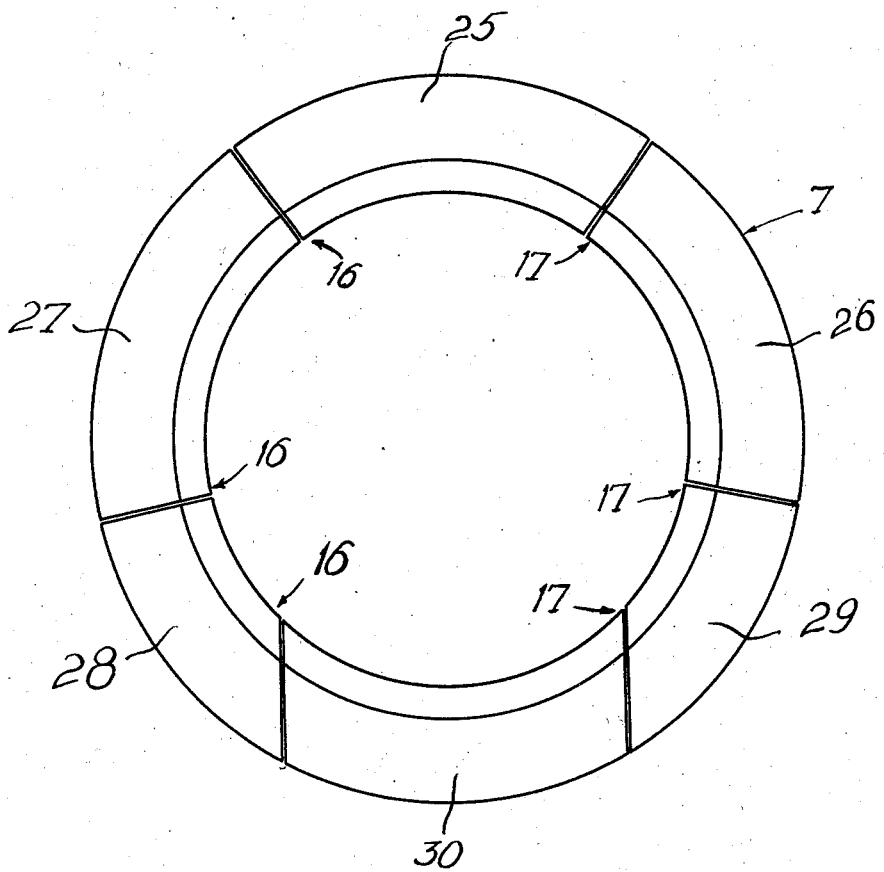
Fig. 8 is a schematic view showing how the annular supporting member is divided into sections.

Referring now, more particularly, to the accompanying drawings, there is provided a tire casing 1 in which is inserted a protective lining in the form of a channel 2 as a protection to the inner surface of the casing from whatever slight wear may be occasioned by the plurality of U-shaped, stiff-ended, tapering thickness, radial springs 3 removably mounted within the casing with their straight and thickened ends inserted in a free sliding, snug fitting manner in tubular sockets 4 of a sectional annular supporting member 7. The sockets are inserted between and countersunk in arcuate plates 5 and 6, arranged in pairs to form the sections of the supporting member. The radial divisions or cuts between sections of the supporting member, shown in Figure 8, are made exactly between sockets 4 so that they are not affected. The parallel divisions or cuts are made so that they only strike one socket. Such sockets are cut diagonally in halves to follow the parallel lines, and each half welded to corresponding section. These sections are suitably joined by female and male dove-tail joints 16 and 17, and fasteners 18 are employed to releasably hold the dove-tailed sections in circumferential alignment. In this connection it is to be noted that only the plates 5, which are of less width than the plates 6, are positioned within the casing.

The U-shaped springs 3 are made with a tapering thickness, being thickest at the ends 22, thinner at the side portions 23 and thinnest at the tread portion 24, as shown in Figure 3, while their straight ends 21 protrude through the open ended tubular sockets 4 and contact the outer surface of the split adjustable floating cylinder 8, the ends of the springs engaging in circumferential grooves 9 near the side edges of the said cylinder. This floating cylinder is expanded by turnbuckle 19 held in position by supports 20 and forces all of the springs inside the casing until the desired tension is secured, whereupon the overlapping ends of the cylinder 8 are firmly bolted together as at 10 and the turnbuckle withdrawn. This combination of parts is inserted within a two-part flanged or channeled rim 11, 12, the former being removably fixed to the latter by a suitable nut and bolt arrangement 13, while the rim section 12 is in turn fastened by suitable nut and bolt arrangement 14 to the wheel felly 15.

In assembling the improved cushioned tire, assuming that the parts have been constructed as described, the lining 2 is inserted in casing 1. Section 25 of annular supporting member 7, with a female dove-tail joint 16 at each end, is now taken and corresponding springs 3 inserted in their respective sockets, pushing them as far as they will go, after which this section is inserted in the casing. Then sections 26, 27, 28 and 29, shown in Figure 8, with springs fitted therethrough, are successively inserted in the casing in their numerical order, engaging and bolting each dove-tail joint to that of its mate section. When section 30 is left, the springs corresponding to it are first inserted in the empty space remaining in the casing, and as they will fit snugly therein, they will stand erect ready to receive section 30 whose parallel sides will permit its insertion by pressing it down, engaging all of the springs in their respective sockets until joints engage each other when they will be bolted together, forming a solid unit with all springs snugly fitted inside the casing and having their straight ends protruding through tubular sockets 4. Floating ring 8 with the ends of the turnbuckle 19 engaging in the supports 20 is now contracted to permit the ring being inserted within the wheel, taking care that the ends of all of the springs are properly located in the grooves or channels 9 in the ring 8. Loosening of the turnbuckle will cause the split resilient ring to expand and press against the ends of all of the springs and by again working the turnbuckle with a wrench or the like the cylinder will be further expanded, forcing all of the springs inside of the tire simultaneously and until the desired tension is obtained. The overlapping split ends of the resilient ring are now secured together by the fasteners 10 and the turnbuckle withdrawn. The wheel is now placed against the rim section 12, as shown in Figure 1, after which the rim section 11 is placed in position, also shown in this figure, and tightly secured by the nut and bolt arrangements 13, thus firmly holding the casing in place and producing a substantial seal which is insured by the provision of a circular washer between the contacting faces of the rim sections 11 and 12 as shown in Figure 1. The wheel thus assembled is fixed by the bolts 14 to felly 15 of the wheel.

In operation the wheel will act substantially as follows:

The lowermost springs in contact with the ground through the casing will flatten while their stiff ends will slide through the sockets and press against the outer surface of the floating ring 8 transmitting the load to it.

This ring being resilient absorbs the shock of the impact and will also yield itself while it transmits the load to all other springs contained in the casing by exerting a much greater pressure on the stiff, free-sliding ends, which will cause them to also bend while they transmit the load to the inner surface of the casing throughout its periphery and as a result all the springs within the tire casing are caused to operate simultaneously, even though not in actual contact with the ground, each spring doing its part to proportionately support the loads and overloads. This result permits the mathematical design of springs which, while operating at only a fraction of their working load, will render the same resilience and comfort as now secured by pneumatic tires, making the wheel practically indestructible.

It is believed, in view of the foregoing description, that a further detailed description of the operation of the invention is unnecessary. Likewise, it is believed that the advantages of the invention will be readily apparent.

Having thus fully described the invention, what is claimed as new and fully described by Letters Patent is:

1. In a resilient wheel, a tire casing, a series of springs mounted circumferentially about the inner surface of the casing each having straight end portions projecting radially from the casing and capable of radial sliding movement therein, and a floating resilient ring supporting the projecting ends of the springs in order to simultaneously distribute the load on all of the springs.

2. A resilient wheel, including a flexible tire casing, a series of U-shaped springs having straight attaching portions, sectional annular supporting means having the attaching portions of the springs radially and slidably mounted therethrough, said supporting means being partly arranged within the casing in a manner to hold the springs against the inner surface thereof, a floating resilient ring positioned so that the outer projecting ends of the springs contact the outer surface thereof in order to simultaneously distribute the load on all of the springs, and means for removably clamping the casing and supporting means together and to a wheel felly and acting to loosely house the floating ring.

3. A resilient tire including a flexible casing, a series of U-shaped springs having straight and thickened attaching portions, a sectional annular supporting member through which the straight portions of the springs are radially and slidably mounted, the springs being circumferentially arranged within the casing and the supporting means being also partly arranged within the casing, a floating resilient ring engaged with the outer ends of the thickened attaching portions of the springs to hold the latter under the desired tension within the casing and to distribute the load on all of the springs and a two-part channeled mounting rim for receiving the supporting member and casing and for clamping these parts together and for loosely housing the floating resilient ring.

4. A resilient tire as claimed in claim 3 in which the floating ring is of the split type having overlapping ends arranged to be placed under the desired tension before being fastened together.

5. A resilient tire as claimed in claim 3 in which the sectional annular supporting member comprises a series of sections including spaced arcuate plates and tubes connecting the plates together and through which straight and thickened attaching portions of the springs are slidably and snugly fitted, and means for detachably joining the sections together.

6. In a resilient wheel as claimed in claim 1 wherein the springs are U-shaped and possess a tapering thickness, being thinnest at the tread portion with a gradual increase in thickness toward the outer ends and stiff, straight and thickened end portions.

JOSÉ DANIEL GARCIA.

REFERENCES CITED

The following references are of record in the file of this patent:

UNITED STATES PATENTS

| Number | Name | Date |
| --- | --- | --- |
| 1,234,682 | Mighell | July 24, 1917 |
| 1,341,656 | McGowen | June 1, 1920 |
| 1,346,514 | Small et al. | July 13, 1920 |